Nov. 7, 1933.   B. WILSON   1,934,110
NONFROSTING MIRROR
Filed March 1, 1932   2 Sheets-Sheet 2
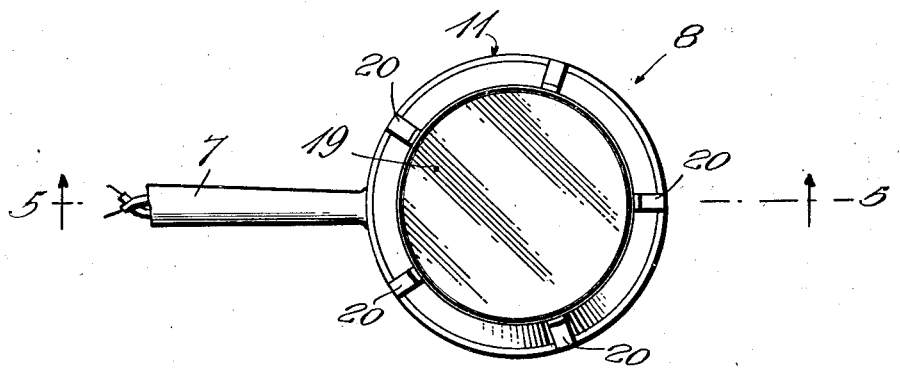
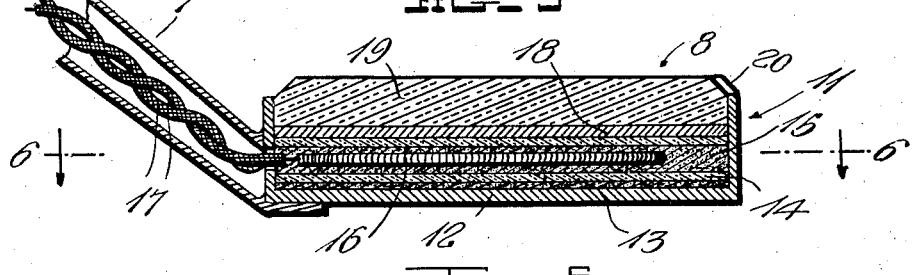
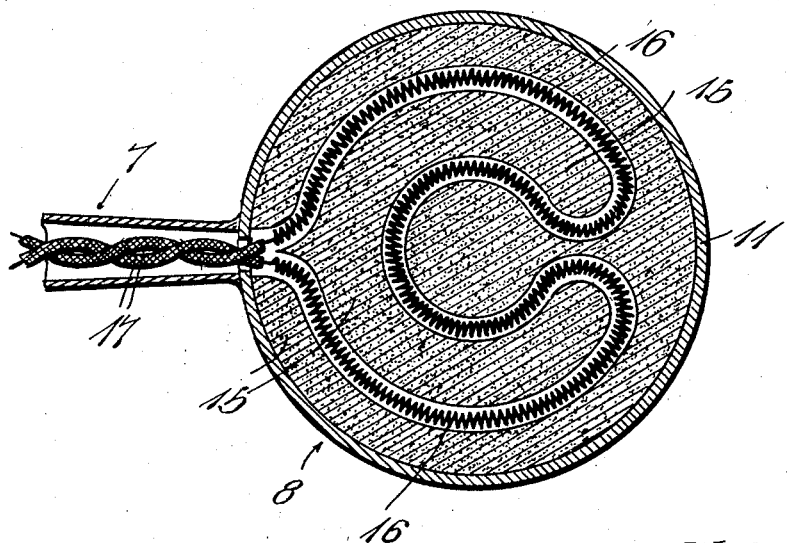
INVENTOR.
B. Wilson,
ATTORNEYS.

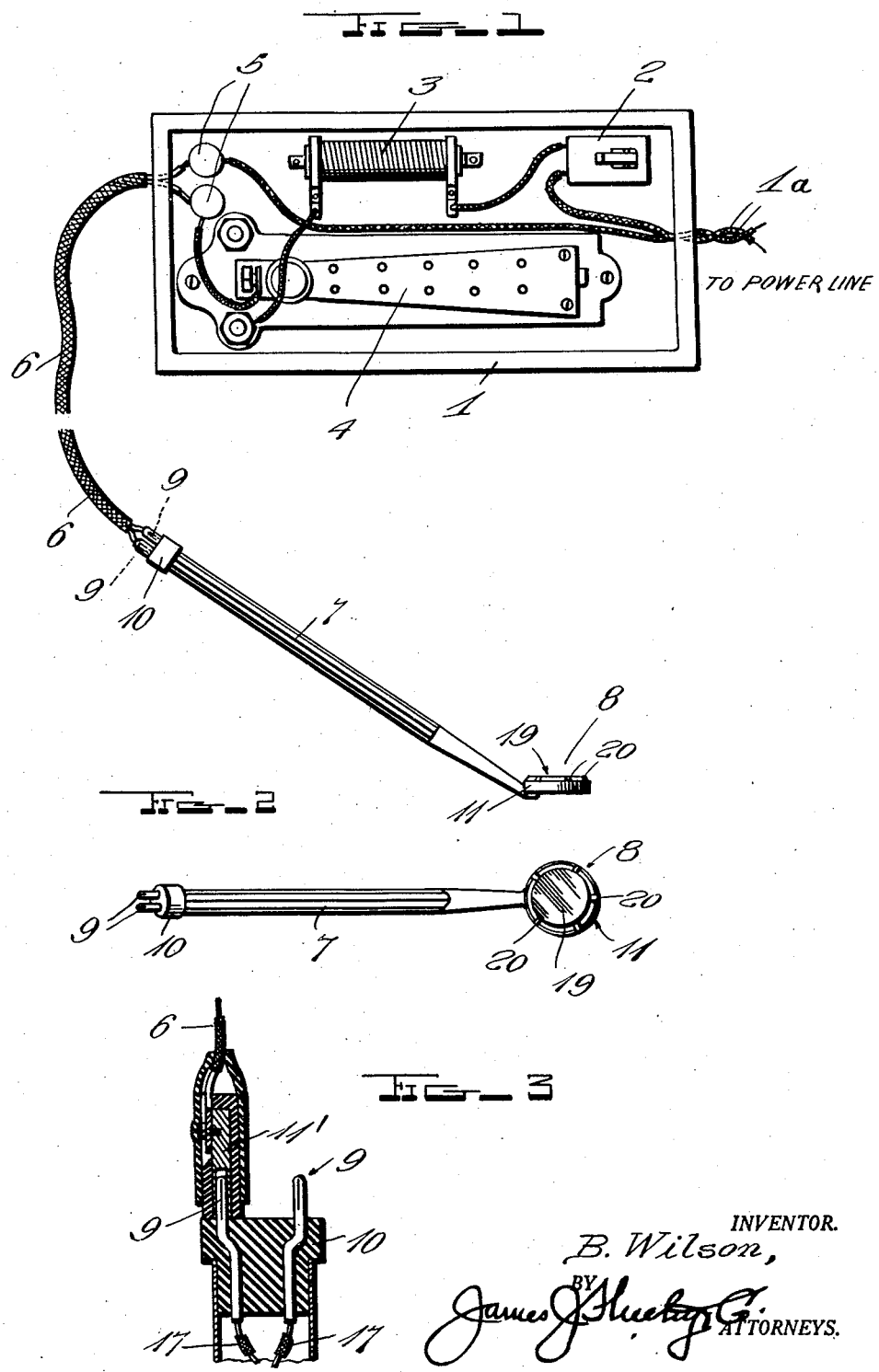

Patented Nov. 7, 1933

1,934,110

UNITED STATES PATENT OFFICE 1,934,110

NONFROSTING MIRROR

Bert Wilson, New Orleans, La.

Application March 1, 1932. Serial No. 596,089

1 Claim. (Cl. 32—27)

My present invention pertains to mirrors, preferably those used by dentists for examining the teeth of a patient and it contemplates the provision of an extremely inexpensive and ingenious construction used in connection with the mirror whereby a film or frost will not appear on the mirror making it necessary for the dentist to continuously remove the mirror from the mouth of the patient for the purpose of wiping the film or frost from said mirror.

The invention further contemplates the provision of a non-frosting or always clear dental mirror that materially facilitates the work of a dentist and permits him to continuously concentrate upon filling and other dental work with the assurance that he will not be continuously annoyed with the frequent removal and replacement of the mirror and dental instruments from and to the mouth.

Other objects of the invention will be fully understood from the following description and claim when read in connection with the drawings in which Figure 1 is a view partly in top plan and partly in side elevation showing the organized mechanism of my novel device.

Figure 2 is a top plan view of the mirror and handle thereof.

Figure 3 is a sectional detail view of the connection I employ to removably disengage the mirror and handle from the power line of the device.

Figure 4 is a plan view of the mirror and a portion of the handle thereof.

Figure 5 is a sectional view taken in the plane indicated by the line 5—5 of Figure 4.

Figure 6 is a sectional view taken in the line indicated by the line 6—6 in Figure 5.

Similar numerals of reference designate corresponding parts in all the views of the drawings.

My novel device comprises a rheostat indicated as a whole by 1 and this box is provided with a cover not shown, and adapted to enter the box at the point illustrated is a power line 1a. Arranged in the box 1 is the toggle switch 2 and the box is further provided with a 900 ohm resistance coil 3 of 98 volts to control the coil under the mirror hereinafter referred to. Also provided in the box 1 is a thermostat 4 adapted to regulate the heat of the mirror coil and at 5, I provide the pole connections for the cable 6. The elements thus far described are of the usual well known construction and in the future practice of the device any other conventional construction may be employed as the thermostatic control arrangement is not of the essence of my invention.

Adapted to be secured to the cable 6 is a handle 7 and this handle is provided on its free end with the mirror 8 and the mirror co-acting elements hereinafter specifically referred to.

The handle 7 is preferably provided with the two terminals 9 that are of the split pole type illustrated and are set in the plug 10 which plug is sealed in the handle 7 with waterproof cement, and secured to this handle is the shell or sleeve 11'.

Adapted to engage the mirror construction and heating element thereof is the metallic sleeve 11 having the bottom portion 12 adapted to firmly hold in said shell the thin sheet of asbestos 13 while superimposed on this thin sheet of asbestos is a layer of mica. Directly bearing upon this layer of mica is a layer of pressed insulation product into which the coil 16 is embedded. Connected with the coil 16 is the wiring 17 that passes through the handle 7 and engages the split pole terminals 9 of the plug 10. Superimposed on the insulation 15 is a thin sheet of mica similar to the sheet 14 and bearing upon this sheet of mica and directly below the mirror 19 is a sheet metal plate 18 welded into the casing 11 so as to be waterproof.

The mirror 19 is bevelled on its outer face and the shell or casing is provided with equi-distant prongs on its upper portion whereby the prongs are adapted to engage the outer edge of the mirror and secure the mirror in the shell. Manifestly long usage of the mirror will cause the face thereof to be scratched by contacting the teeth of the patient and hence the mirror may be removed and replaced with a new mirror by merely lifting the prongs 20 of the shell 11.

In the practical use of the device the power line is plugged into a convenient socket and the toggle switch thrown so as to cause a flow of current through the rheostat box. This action will be attended by heating of the mirror element or device indicated as a whole by 8 and to a degree of approximately 98 degrees F. The thermostat control will keep the heat to the mirror at a constant 98 degrees level which degrees is approximately equal to that of the mouth. Consequently frosting or blurring of the mirror by the breath will be precluded.

I would distinctly have it understood that the construction and arrangement of the insulation and heating of the mirror as well as the waterproofing of the element 8 of my device constitutes my invention and I do not care to be confined to the use to which the device is put for the reason that other surgical uses might suggest themselves in the practice of my invention.

The device is so constructed and arranged that the liability of injury to a patient is absolutely precluded and the simple elements that enter into the construction of the device are such that they are not liable to become inoperative after a short period of use.

The mirror construction comprising the shell and handle as above referred to are preferably one piece and as set forth, a sheet of asbestos is placed in the shell, the wires attached to the coil are insulated from the mirror end through the handle and a thin sheet of mica placed under and above the coil and the top metal plate is welded in place on the top sheet of mica to make the mirror end waterproof and the elements are then sealed up making the device entirely waterproof. The mirror is then insulated completing the instrument. Due to the low temperature of heating the mirror under the coil, this coil will last practically a life time and in fact this is true of the entire construction. The cheapness of manufacturing of the device would make it unprofitable to repair same if by any chance occasion should possibly arise to do so. The handle may be welded to the shell practically making it a one piece instrument or the shell may form an integral part of the handle. The different layers of insulation, coil, etc. are cut round to fit the shell and when the metal covering is pressed down and all the elements are welded in place it is impossible for the coil, mirror or other elements to move.

What I claim is:

A dental mirror comprising a cylindrical sleeve closed at its under side and open at its upper side, the sleeve being provided with an opening in its side wall, a layer of insulation disposed across the sleeve opposite the opening in the side wall thereof, a coil encased within the insulation and having ends passing through the opening in the wall of the sleeve, disks of mica applied to the opposite sides of the layer of insulation, a disk of asbestos resting between the lower disk of mica and the surface of the bottom wall of the sleeve, a metallic plate housed in the sleeve and resting upon the surface of the upper disk of mica, the edge of said plate bearing against the wall of the sleeve and sealing the open side thereof, a mirror received within the sleeve and resting upon the metal plate and the sleeve having prongs clinched upon the edges of the mirror.

BERT WILSON.